US009322942B2

(12) United States Patent
Mellier et al.

(10) Patent No.: US 9,322,942 B2
(45) Date of Patent: Apr. 26, 2016

(54) STREAMER FOR SEISMIC PROSPECTION COMPRISING TILT COMPENSATION OF DIRECTIONAL SENSORS

(71) Applicant: SERCEL, Carquefou (FR)

(72) Inventors: Gaetan Mellier, Nantes (FR); John Hepp, Leander, TX (US); Mike Maples, Houston, TX (US); Simon Leboeuf, Monnieres (FR); Isabelle Sellin, Vigneux de Bretagne (FR)

(73) Assignee: SERCEL, Carquefou (FR)

( * ) Notice: Subject to any disclaimer, the term of this patent is extended or adjusted under 35 U.S.C. 154(b) by 325 days.

(21) Appl. No.: 13/950,253

(22) Filed: Jul. 24, 2013

(65) Prior Publication Data

US 2014/0029377 A1    Jan. 30, 2014

(30) Foreign Application Priority Data

Jul. 27, 2012  (EP) .................... 12305927

(51) Int. Cl.
*G01V 1/00* (2006.01)
*G01V 1/18* (2006.01)
*G01V 1/38* (2006.01)

(52) U.S. Cl.
CPC .. *G01V 1/18* (2013.01); *G01V 1/00* (2013.01); *G01V 1/3817* (2013.01); *G01V 1/38* (2013.01)

(58) Field of Classification Search
CPC ....... G01V 13/00; G01V 1/18; G01V 1/3817; G01V 1/00; G01V 1/38
See application file for complete search history.

(56) References Cited

U.S. PATENT DOCUMENTS

| 6,205,403 | B1 | 3/2001 | Gaiser | |
|---|---|---|---|---|
| 6,883,638 | B1 * | 4/2005 | Maxwell | G01D 11/245 181/102 |
| 2003/0117893 | A1 * | 6/2003 | Bary | G01V 1/3852 367/16 |
| 2004/0249573 | A1 * | 12/2004 | McElhinney | G01V 3/26 702/7 |
| 2005/0201206 | A1 * | 9/2005 | Luc | G01V 1/181 367/182 |
| 2006/0133202 | A1 * | 6/2006 | Tenghamn | G01V 1/38 267/24 |
| 2008/0049551 | A1 | 2/2008 | Muyzert | |
| 2008/0291779 | A1 | 11/2008 | Muyzert | |
| 2011/0182138 | A1 * | 7/2011 | Sudow | G01V 1/3826 367/16 |
| 2011/0279120 | A1 | 11/2011 | Suedow | |
| 2011/0310698 | A1 * | 12/2011 | Maples | G01V 1/184 367/20 |

* cited by examiner

*Primary Examiner* — Luke Ratcliffe
*Assistant Examiner* — Hovhannes Baghdasaryan
(74) *Attorney, Agent, or Firm* — Blakely Sokoloff Taylor & Zafman LLP

(57) ABSTRACT

A streamer for seismic prospection comprising directional sensors (20), such as geophones or accelerometers, distributed along the streamer, characterized in that said streamer comprises at least two tilt sensors (30, 40) located in remote positions and in locations distant from the directional sensors (20) and means which determined the effective orientation of each directional sensor (20) by interpolating along the streamer the tilt detected by the two tilt sensors (30, 40).

14 Claims, 2 Drawing Sheets

STREAMER FOR SEISMIC PROSPECTION COMPRISING TILT COMPENSATION OF DIRECTIONAL SENSORS

FIELD OF THE INVENTION

The invention relates to the marine seismic prospection field specially designed for hydrocarbon exploration. The invention relates more precisely to multi-component seismic acquisition using a towed streamer.

BACKGROUND OF THE INVENTION

In seismic exploration, geophysical data are obtained by applying acoustic energy to the earth from an acoustic source and detecting seismic energy reflected from interfaces between different layers in subsurface formations. The seismic wavefield is reflected when there is a difference in acoustic impedance between the layers on either side of the interface.

Marine seismic prospection is generally made with seismic streamers which are towed through water behind a recorder vessel at a water depth normally between about six to about nine meters, but can be towed shallower or deeper. The streamers support sensors such as hydrophones to detect seismic signals corresponding to pressure waves. Seismic sources may be also towed behind the recorder vessel. Seismic sources may be for example air gun arrays or water gun arrays or other sources known to those skilled in the seismic art.

Alternatively the seismic streamers are maintained at a substantially stationary position in a body of water, either floating at a selected depth or lying on the bottom of the body of water, in which case the source may be towed behind a vessel to generate acoustic energy at varying locations or the source may be maintained in a stationary position.

Multi-component streamers usually use at least two nearly co-located sensors (or group of sensors), one pressure sensor (hydrophone), or a group of pressure sensors and at least one particle motion sensor (geophone or accelerometer) or a group of particle motion sensors.

The at least one particle motion sensor (or the particle motion sensors group) is nearly collocated to the pressure sensor (or pressure sensor group).

While the hydrophone is an omnidirectional sensor and so, does not need to be oriented, the particle motion sensors measure the amplitude of the wave (speed or acceleration of the particle) on a given direction. To do so, the sensors orientation must be known.

Knowing that it is nearly impossible to predict the rotation of the streamer in water, there are usually two possible solutions to know said given direction.

A first solution consists in mechanically insuring that the particle motion sensor(s) is in a known orientation using for example gravity. One way to perform this is to ballast the sensor and gimbal mount the sensor in a housing filled with lubricant damping fluid.

A second solution is to create a 2 or 3-dimension particle motion sensor base and to use a co-located tilt sensor, with a known orientation compared to this base. The tilt measurement is then used to recover the vertical, crossline, or the inline component of the particle motion wave. This can for example be implemented through a MEMs device, that can measure at the same time the tilt and the acceleration.

The first solution has the main disadvantage of affecting the particle motion sensor response, as the motion of the sensor induced by cable rotation is biased by the gimbal arrangement (inertia, friction, etc.). Moreover, such gimbal mounting is usually complex by involving additional mechanical parts and take too much space in the cable.

The second solution solves the issues described above, but it has the drawback of requiring an additional sensor at the sensor location and its associated power. This means more wires in the cable and so, some impact on the overall weight and size of the cable. Furthermore, when this second solution is implemented with a MEMS accelerometer, this solution does not allow to design an analog sensors group, that is necessary to achieve good noise performance without impacted the necessary data rate to get the data back to the boat.

Non limitative examples of known sensors for seismic streamers may be found in prior art documents US 2011/0310698, WO 2011/162799, US 2007/0036033, U.S. Pat. No. 5,675,556 and U.S. Pat. No. 5,541,894.

SUMMARY OF THE INVENTION

The present invention aims to overcome the different drawbacks of the prior art.

More precisely the invention aims:
to avoid the need for a tilt sensor at the particle motion sensor location,
to improve the particle motion response, and
to reduce the overall weight and size of the cable.

For this purpose, the present invention relates to a streamer for seismic prospection comprising directional sensors, such as geophones or accelerometers, distributed along the streamer, said streamer comprising:
at least two tilt sensors located in remote positions and in locations distant from the directional sensors; and
means for determining the effective orientation of each directional sensor by interpolating along the streamer the tilt detected by the two tilt sensors, characterized in that said streamer further comprises auxiliary means for determining the orientation of a first wavefield received on a directional sensor and which determine the effective orientation of each directional sensor from the orientation of this first wavefield wherein the orientation of the directional sensor resulting from the interpolation along the streamer of the tilt detected by the two tilt sensors is corrected when the theoretical value obtained with interpolation of the relative orientation between two tilt sensors differs from the value estimated by the orientation of the first wavefield.

The invention relates also to a seismic prospection process implementing a streamer comprising directional sensors, such as geophones or accelerometers, distributed along the streamer, comprising the steps of:
determining tilt values on at least two tilt sensors located in remote positions and in locations distant from the directional sensors; and
determining the effective orientation of each directional sensor by interpolating along the streamer the tilt detected by the two tilt sensors, characterized in that said process further comprises the step of determining the orientation of a first wavefield received on a directional sensor so as to determine the effective orientation of each directional sensor from the orientation of this first wavefield and correcting the orientation of the directional sensor resulting from the interpolation along the streamer of the tilt detected by the two tilt sensors, when the theoretical value obtained with interpolation of the relative orientation between two tilt sensors differs from the value estimated by the orientation of the first wavefield.

BRIEF DESCRIPTION OF THE DRAWINGS

Additional and other objects, features and advantages of the invention will become apparent from the description set forth hereinafter when considered in conjunction with the accompanying drawings, in which.

DETAILED DESCRIPTION OF A PREFERRED EMBODIMENT OF THE INVENTION

Figure 1:
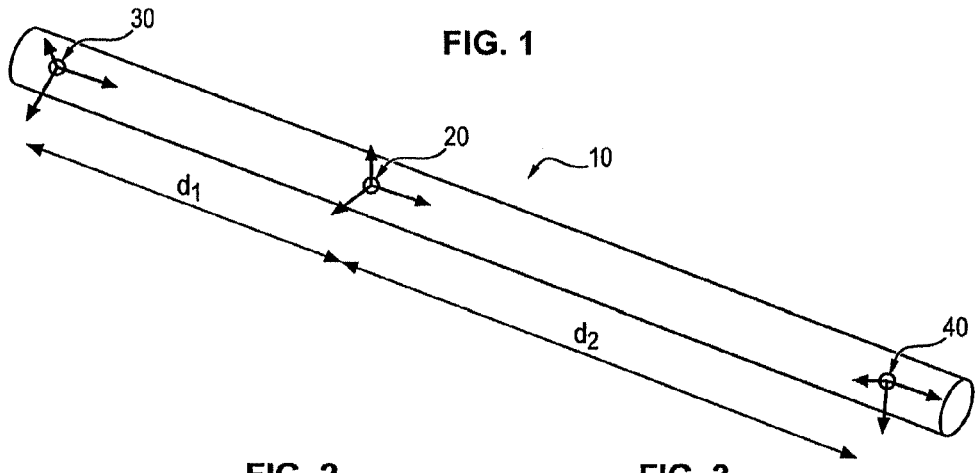
FIG. 1 is a general and schematic view of a streamer in accordance with the present invention.

FIG. 1 illustrates schematically a part of a streamer 10 in accordance with the present invention.

The general structure of the streamer 10 is well known in itself by the man skilled in the art. Consequently the structure of the streamer 10 will not be described in detail in the following description.

Said streamer comprises a great number of sensors combining hydrophones and particle motion sensors, distributed along the streamer 10 between a head end connected to a recorder vessel and a tail end generally supported by a tail buoy.

One of such sensor is schematically illustrated on FIG. 1 under reference 20.

A hydrophone is a submersible pressure sensor that converts pressure waves into electrical or optical signals. A particle motion sensor is a sensor that measures the amplitude of a wave (speed or acceleration of the particle) on a given direction. The signals issued by the hydrophones and particle motion sensors are recorded for signal processing and subsequently evaluated to estimate characteristics of the subsurface of the earth.

Generally outputs of the sensors are connected to nodes distributed along the streamer and the streamer comprises also controllers distributed along the streamer to concentrate the data issued from associated active units formed by a plurality of nodes and to direct these signals on optical fibers adapted to route the signals towards the recorder vessel.

Streamer cables are subject to unpredictable torsion when at sea.

As indicated above, according to the present invention the streamer 10 comprises at least two tilt sensors 30, 40 located in remote positions and in locations distant from the directional sensors 20. Directional sensor 20 is between the two tilt sensors 30 and 40 at a distance d1 of tilt sensor 30 and a distance d2 of tilt sensor 40. Correction means are provided to determine the effective orientation of each directional sensor 20 by interpolating along the streamer the tilt detected by the two tilt sensors 30 and 40.

Such correction means may be provided on the streamer, on the recorder vessel or on any other suitable place.

In practice the streamer may comprise more than two tilt sensors 30, 40 distributed along the streamer between the head end and the tail end.

Typically the distance between two successive tilts sensors 30, 40 may be between 2 times to 10 times greater than the distance between two successive groups of hydrophones and particle motion sensors 20 depending on the sensor group interval and the cable stiffness.

For example when the distance between two successive groups of hydrophones and particle motion sensors 20 is about 12.5 m, the distance between two successive tilt sensors 30, 40 may be about 25 m.

Typically the length of a streamer may be about 10 km. However the present invention applies to any length of streamer.

The tilt sensors 30, 40 may be for example a 3D accelerometer, an accelerometer associated with a gyroscope or the combination of 3 accelerometers.

Locating the tilt sensors 30, 40 in locations distant from the directional sensors 20, for example, at an existing embedded electronic location or in a module inserted between streamer sections, avoids that additional wires be required for powering said tilt sensors as well as for processing the signals issued by said tilt sensors, compared to what already exists for the power, telemetry and seismic sensors in the prior art.

The tilt measurement issued from the tilt sensors 30, 40 may not reflect exactly the particle motion sensors 20 orientation, due for example to manufacturing constraints or unpredictable torsion of the cable when at sea.

However interpolating the tilt detected by the two tilt sensors 30 and 40, along the streamer, allows determining precisely the tilt of the streamer at the location of the particle motion sensors 20.

Figure 2:
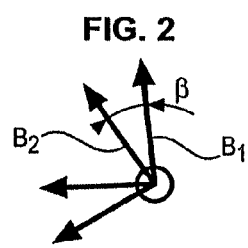
FIG. 2 illustrates the relative orientation between two successive tilt sensors distributed along a streamer.

FIG. 2 illustrates the tilt value $\beta$ measured between the bases B1 and B2 of two consecutive tilt sensors 30, 40.

Figure 3:
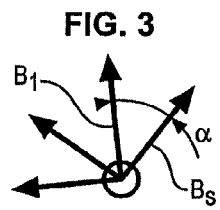
FIG. 3 illustrates the orientation of a particle motion sensor relative to a closest tilt sensor.

FIG. 3 illustrates the tilt value $\alpha$ between the base Bs of a particle motion sensor 20 and the base B1 of the closest tilt sensor 30. Tilt value $\alpha$ is obtained by interpolation along the streamer the tilt value $\beta$ measured between the bases B1 and B2 of two consecutive tilt sensors 30, 40.

A first approximation of the relative orientation of the particle sensor 20 can be obtained by design or with the help of a calibration process when manufacturing the streamer. In the case of a calibration process, the relative orientation of two successive tilts sensors 30, 40 $\beta_c$ as well as the relative orientation $\alpha_c$ of a particle sensor 20 in regard of a tilt sensor 30, 40, can be estimated by laying the streamer cable in a known configuration close to the configuration that the cable will be subject at sea (tension and low friction with any sustaining table, etc.), aligning the particle motion sensor 20 at a known position and measuring the tilt seen by the tilt sensors 30, 40. The obtained calibration values $\beta_c$ and $\alpha_c$ can then be stored to be used during seismic recording or processing by the processing means to correct tilt measurements and regenerate the tilt $\alpha$ at the particle motion sensor location 20.

This additional information $\beta_c$ and $\alpha_c$ can then be used during seismic recording or processing as described below.

Tilt sensors 30 and 40 are used to determine effective tilt value $\beta$ when at sea. The comparison between the effective tilt value $\beta$ and the calibration value $\beta_c$ provides an estimate of the torsion seen by the cable at sea over the length $d_1+d_2$. If the effective tilt value $\beta$ is equal to the calibration value $\beta_c$, the calibration value $\alpha_c$ of the particle motion sensor 20 may be used. If the effective tilt value $\beta$ is not equal to the calibration value $\beta_c$, the effective value $\alpha$ of the particle motion sensor 20 is determined using an interpolation process on the effective tilt value $\beta$ between the two tilt sensors 30 and 40.

The interpolation can be linear between the two tilt sensors 30 and 40, but it can be extended to whatever type of interpolation, provided that the streamer cable have regularly spaced tilt sensors to provide reference bases.

For this interpolation to be effective, tilt sensors 30, 40 need to be positioned regularly along the streamer, the distance between two successive tilt sensors 30, 40 being such that the torsion involved by normal operation of the streamer does not induce more than 360° rotation between both successive sensors 30 and 40, compare to the nominal relative position of both sensors 30 and 40, when not subject to any torque.

More precisely according to the present invention, the distance d1+d2 between two successive tilt sensors 30, 40 is less than L/2, L being the length of the streamer for which the torsion is about 360° compare to the nominal relative position when not subject to any torque.

According to the invention, the streamer of the invention also comprises additional means adapted for determining the orientation of a first wavefield received on a directional sensor and which determine the effective orientation of each directional sensor from the orientation of this first wavefield.

Figure 4:
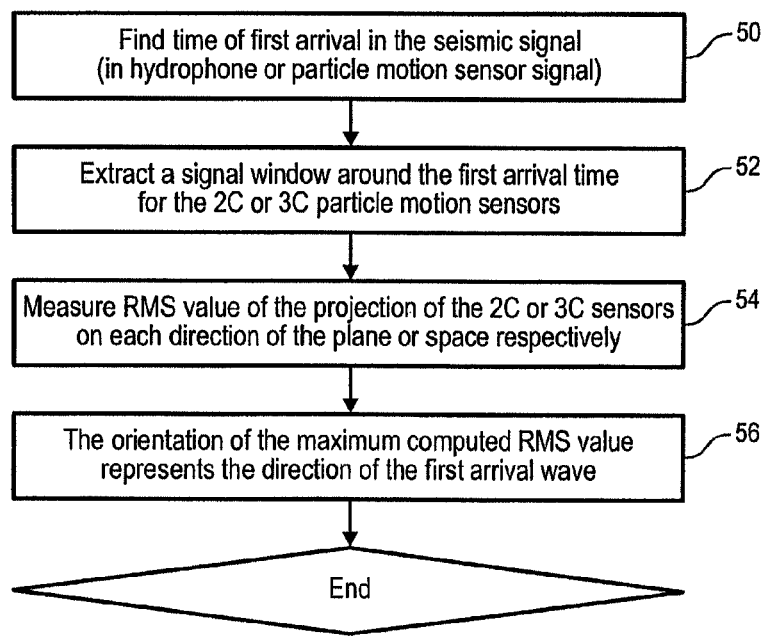
FIG. 4 illustrates an algorithm to estimate effective orientation of a directional sensor on the basis of detection of a first received wavefield.

The corresponding algorithm for the determination of the first arrival is illustrated on FIG. 4.

In a first step 50, the correction means detects the occurrence of a first arrival in the seismic signal. This detection may be made either on the signals issued by the hydrophones or on the signals issued by the particle motion sensors.

In a second step 52, the correction means extracts from the signals issued by the particle motion sensors, a signal window around the timing of the first arrival detected at first step 50.

Then in a third step 54, the correction means measures the root means square (RMS) of the projection of the signals issued by the particle motion sensors on each direction of the plane (in case of a 2D sensor) or space (in case of a 3D sensor) respectively. This third step 54 which corresponds to a rotation procedure of data will be explained more in detail subsequently in regard of FIG. 5.

Finally in a fourth step 56, the correction means determines the orientation of the maximum computed RMS value and considers that the orientation of the maximum computed RMS value represents the direction of the first arrival wave.

Preferentially, the detection of the tilt from the two tilt sensors and the interpolation along the streamer of the tilt detected by the two tilt sensors is operated at a sampling frequency corresponding to the sampling frequency of seismic measures from the sensors such as hydrophones, advantageously about 500 Hz, while the correction based on the orientation issued from the detection of the first wavefield is operated at the same frequency than the activation of the seismic sources, advantageously once for each 10 s timing corresponding to a frequency about 0.1 Hz.

Figure 5:
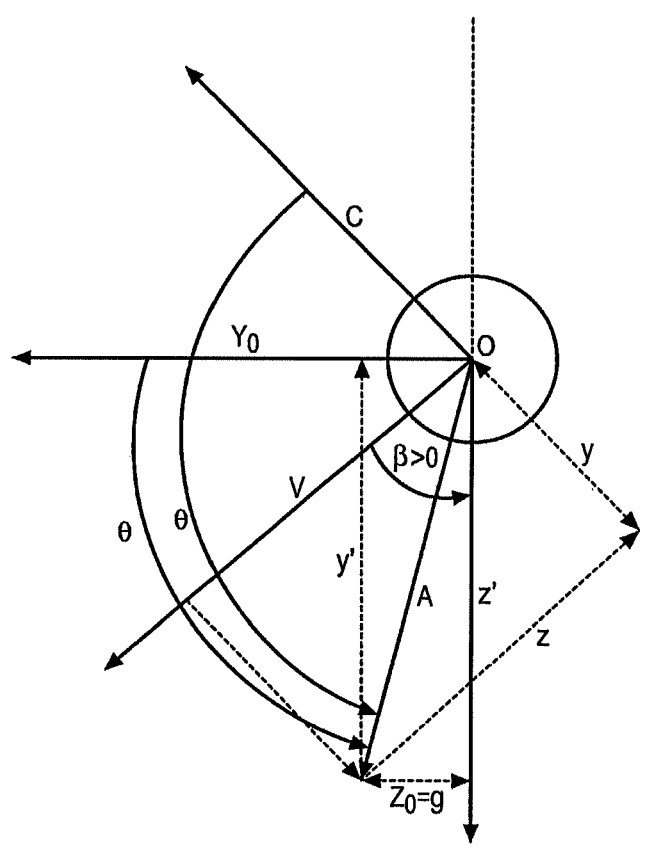
FIG. 5 illustrates different vectors and angles in 2D dimensions in relation to a rotation procedure of data implemented to detect the first received wavefield.

FIG. 5 illustrates a rotation procedure of data implemented in third step 54 upon the acceleration data issued from a particle motion sensor having at least two perpendicular sensing axis, such as a Vertical output and a Crossline output. When operating the measure, the true orientation of the particle motion sensor is unknown. The aim of the rotation procedure on acceleration data is to obtain the true vertical and crossline acceleration.

(X0,Y0,Z0) is a right-handed coordinate system with:
X0 in the direction of the tail of the streamer
Z0 in the direction of the gravity (g).
(I,C,V) is also a right-handed coordinate system with:
I-in the same direction as X0.
C is the sensing axis of the Crossline output of the particle motion sensor. Typically a mechanical impulse in the direction C causes a positive electrical impulse on the Crossline output.
V is the sensing axis of the Vertical output of the particle motion sensor. Typically a mechanical impulse in the direction V causes a positive electrical impulse on the Vertical output.
A is a representation of the acceleration seen by the particle motion sensor and recorded by the system.

The coordinates of A in (Y0,O,Z0) are (y',z')
The coordinates of A in (C,0,V) are (y,z)
The polar coordinates of A in (C,0,V)=(|A|,θ) so that $$y = A \times \cos\theta$$

$$z = A \times \sin\theta$$

In the coordinate system (Y0,O,Z0):

$$y' = |A| \times \cos\theta' = |A| \times \cos(\theta-\beta)$$

$$z' = |A| \times \sin\theta' = |A| \times \sin(\theta-\beta)$$

So, in the Cartesian coordinate system:

$$y' = y \times \cos\beta + z \times \sin\beta$$

$$z' = -y \times \sin\beta + z \times \cos\beta$$

So rotating the measured data y and z by changing the value of β in the above formula until obtaining the maximum z' value, and taking into account the polarity of the initial measured data y and z so as to discriminate between two maxima of z' resulting from the rotation procedure, allows to find the corresponding angle β between the Vertical axis of the particle motion sensor and the incidence direction of the first wavefield.

Another way for obtaining the angle β is to calculate the value of arctangent y/z.

This first arrival wave is considered as due to reflection on the sea floor.

In a first implementation of the invention, considering that the sea floor is flat and horizontal, the direction of this first arrival wave is considered as vertical (perpendicular to the horizontal).

In a second implementation of the invention, using available oceanographic seafloor elevation information, the direction of this first arrival wave may be determined more precisely as being perpendicular to the local sea floor.

The method based on determining the effective orientation of each directional sensor from the orientation of a first wavefield as illustrated on FIG. 4, may be used to estimate if the correction applied by the first solution based on the interpolation of the relative orientation between two tilt sensors 30, 40 is accurate enough, and eventually to apply additional correction.

By comparing the theoretical value obtained with interpolation of the relative orientation between two tilt sensors 30, 40 to the value estimated by the algorithm illustrated in FIG. 4, the orientation of the particle motion sensor base 20 can be compared to vertical, and eventually corrected.

Field experiments have shown that in the case of a solid cable, the torsion of the cable is stable across time. This is partly due to the torsional stiffness of a solid cable. That means that oscillations seen by a remote tilt sensor 30 or 40 are accurately representing the oscillations seen by a particle motion sensor 2C or 3C arrangement 20.

Consequently any oscillations detected by a tilt sensor 30 or 40 may be used to accurately recover the constant bias of orientation of the particle motion sensor arrangement 20, by compensating said oscillations.

Additionally, the algorithm illustrated in FIG. 4 can also be used in case of a 2C or a 3C gimbal arrangement provided for a particle motion sensor, as it can provide an information upon that the arrangement is well oriented.

While the invention has been shown and describes by referring to preferred embodiments thereof, it is to be understood that the invention is not limited to the specific form of these embodiments and that many changes and modifications may be made therein without departing from the scope of the invention.

The invention claimed is:

1. A streamer for seismic prospection comprising directional sensors (20), such as geophones or accelerometers, distributed along the streamer, said streamer comprising:
   at least two tilt sensors (30, 40) located regularly along the streamer in remote positions and in locations distant from the directional sensors, the distance between two successive sensors (30,40) being such that the torsion produced by normal operation of the streamer does not induce more than 360° rotation between two successive sensors, compared to the normal relative position of the at least two successive tilt sensors (30,40) when not subject to any torque; and
   a processor configured to determine a tilt detected by each of the at least two tilt sensors (30,40), interpolating the tilt detected by the at least two tilt sensors along the streamer so as to define by interpolation a tilt of the streamer at the location of each directional sensor and determining that the effective orientation of each directional sensor (20) is equal to the tilt of the streamer defined at the location of each directional sensor by interpolating along the streamer the tilt detected by the at least two tilt sensors (30, 40), characterized in that said streamer further comprises an auxiliary processor configured to determine the orientation of a first wavefield received on one of said directional sensors (20) and which determines the effective orientation of each directional sensor (20) from the orientation of this first wavefield, wherein the orientation of the directional sensor (20) resulting from the interpolation along the streamer of the tilt detected by the at least two tilt sensors (30, 40) is corrected using a difference between the theoretical value obtained with interpolation of the relative orientation between the at least two tilt sensors (30, 40) and the value estimated by the orientation of the first wavefield, wherein the auxiliary processor is configured to:
      detect the occurrence of a first arrival in a seismic signal issued by a hydrophone or a particle motion sensor;
      extract from the signals issued by a directional sensor, such as a particle motion sensor (20), a signal window around the timing of the first arrival detected;
      measure the root mean square of the projection of the signals issued by the directional sensor on each direction of the plane or space;
      determine the orientation of the maximum computed root mean square value and considering this orientation as the direction of the first arrival wave.

2. Streamer according to claim 1, wherein the interpolation of the tilt detected by the at least two tilt sensors (30, 40) along the streamer is a linear one.

3. Streamer according to claim 1, wherein the distance (d1+d2) between two successive tilt sensors (30, 40) is less than L/2, L being the length of the streamer for which the torsion is about 360° compare to the nominal relative position when not subject to any torque.

4. Streamer according to claim 1, wherein the distance between two successive tilts sensors (30, 40) is between 2 times to 10 times greater than the distance between two successive groups of directional sensors (20).

5. Streamer according to claim 1 wherein the distance between two successive tilt sensors (30, 40) is about 25 m.

6. Streamer according to claim 1, further comprising means for comparing a calibration tilt relative value ($\beta_c$) between the at least two tilt sensors (30, 40) obtained during a calibration process when manufacturing the streamer with the effective tilt value $\beta$ when at sea measured on the outputs of the at least two tilt sensors (30, 40) and means for selecting a calibration value $\alpha_c$ of each directional sensor (20) if the effective tilt value $\beta$ is equal to the calibration value $\beta_c$, and determining an effective value $\alpha$ of each directional sensor (20) by an interpolation process on the effective tilt value $\beta$ between the at least two tilt sensors (30, 40) if the effective tilt value $\beta$ is not equal to the calibration value $\beta_c$.

7. Streamer according to claim 1, wherein the measuring the root mean square of the projection of the signals issued by the directional sensor on each direction of the plane or space and determining the orientation of the maximum computed root mean square value and considering this orientation as the direction of the first arrival wave, implements a rotation procedure upon the measured data issued from a directional sensor corresponding to two perpendicular sensing axis.

8. Streamer according to claim 1, wherein the sea floor being flat and horizontal, the direction of this first arrival wave is considered as vertical (perpendicular to the horizontal).

9. Streamer according to claim 1, wherein the direction of this first arrival wave is determined as being perpendicular to the local oceanographic seafloor elevation information.

10. Streamer according to claim 1, wherein the at least two tilt sensors (30, 40) are chosen in the group comprising a 3D accelerometer, an accelerometer associated with a gyroscope or the combination of 3 accelerometers.

11. Streamer according to claim 1, wherein the at least two tilt sensors (30, 40) are collocated with an electronic location or in a module inserted between streamer sections so as to avoid that additional wires be required for powering said tilt sensors as well as for processing the signals issued by said tilt sensors.

12. A seismic prospection process implementing a streamer comprising directional sensors (20), such as geophones or accelerometers, distributed along the streamer, comprising the steps of:
   determining tilt values on at least two tilt sensors (30, 40) located regularly along the streamer in remote positions and in locations distant from the directional sensors (20) the distance between two successive sensors (30,40) being such that the torsion produced by normal operation of the streamer does not induce more than 360° rotation between two successive sensors, compared to the normal relative position of the at least two successive tilt sensors (30,40) when not subject to any torque; and
   determining the effective orientation of each directional sensor (20) by interpolating along the streamer, at the location of each directional sensor the tilt detected by the at least two tilt sensors (30, 40), characterized in that said process further comprises the step of determining the orientation of a first wavefield received on one of said directional sensors (20) so as to determine the effective orientation of each directional sensor (20) from the orientation of this first wavefield and the orientation of the one directional sensor (20) resulting from the interpolation along the streamer of the tilt detected by the at least two tilt sensors (30, 40) is corrected using a difference between the theoretical value obtained with interpolation of the relative orientation between the at least two tilt sensors (30, 40) and the value estimated by the orientation of the first wavefield,
   wherein said step of determining the orientation of a first wavefield received on a directional sensor (20) comprises detecting the occurrence of a first arrival in a seismic signal issued by a hydrophone or a particle motion sensor;

extracting from the signals issued by a directional sensor, such as a particle motion sensor (20), a signal window around the timing of the first arrival detected;

measuring the root mean square of the projection of the signals issued by the directional sensor on each direction of the plane or space by implementing a rotation procedure upon the measured data issued from the directional sensor on two perpendicular sensing axis;

determining the orientation of the maximum computed root mean square value and considering this orientation as the direction of the first arrival wave.

13. Process according to claim 12 wherein the detection of the tilt from the at least two tilt sensors and the interpolation along the streamer of the tilt detected by the at least two tilt sensors is operated at a sampling frequency corresponding to the sampling frequency of seismic measures from the sensors such as hydrophones while the correction based on the orientation issued from the detection of the first wavefield is operated at the same frequency than the activation of the seismic sources.

14. Process according to claim 12 wherein the detection of the tilt from the at least two tilt sensors and the interpolating along the streamer of the tilt detected by the at least two tilt sensors is operated at a sampling frequency about 500 Hz while the correction based on the orientation issued from the detection of the first wavefield is operated about 0.1 Hz.

\* \* \* \* \*